(12) United States Patent
Rudy

(10) Patent No.: US 6,336,528 B1
(45) Date of Patent: Jan. 8, 2002

(54) BRAKING DEVICE FOR A LINEAR DRIVE

(75) Inventor: Dietmar Rudy, Kaiserslautern (DE)

(73) Assignee: Ina Walzlager Schaeffler oHG (DE)

( * ) Notice: Subject to any disclaimer, the term of this patent is extended or adjusted under 35 U.S.C. 154(b) by 0 days.

(21) Appl. No.: 09/463,073

(22) PCT Filed: Apr. 8, 1998

(86) PCT No.: PCT/EP98/02027

§ 371 Date: Jan. 17, 2000

§ 102(e) Date: Jan. 17, 2000

(87) PCT Pub. No.: WO99/03638

PCT Pub. Date: Jan. 28, 1999

(30) Foreign Application Priority Data

Jul. 18, 1997 (DE) .......................................... 197 30 819

(51) Int. Cl.[7] .............................................. B61H 7/12
(52) U.S. Cl. ............................ 188/43; 188/170; 188/60
(58) Field of Search ............................ 188/170, 38, 41, 188/42, 43, 60, 153 R; 104/118, 119; 105/141, 144

(56) References Cited

U.S. PATENT DOCUMENTS

| | | | |
|---|---|---|---|
| 4,751,864 A | | 6/1988 | Leigh et al. |
| 4,819,921 A | | 4/1989 | Takahashi |
| 4,953,988 A | | 9/1990 | Tsukada |
| 5,205,204 A | * | 4/1993 | Gottling et al. ................ 92/28 |
| 5,302,062 A | | 4/1994 | Baba et al. |
| 5,632,362 A | * | 5/1997 | Leitner ........................ 188/344 |
| 5,648,644 A | * | 7/1997 | Nagel ......................... 187/288 |
| 6,105,738 A | * | 8/2000 | Christen ..................... 188/170 |
| 6,193,026 B1 | * | 2/2001 | Sevilleja et al. ............ 188/153 |

FOREIGN PATENT DOCUMENTS

| | | |
|---|---|---|
| DE | 970520 | 9/1958 |
| DE | 1894955 | 9/1963 |
| DE | 97843 | 7/1972 |
| DE | 3742965 | 7/1986 |
| DE | 8904334 | 6/1989 |
| DE | 3908588 | 2/1990 |
| DE | 4116795 | 11/1992 |
| DE | 4307047 | 9/1994 |
| DE | 29505080 | 7/1995 |
| DE | 19533077 | 3/1996 |
| DE | 29613345 | 11/1996 |
| DE | 19544534 | 6/1997 |
| GB | 926072 | 5/1963 |
| WO | 9220490 | 11/1992 |

OTHER PUBLICATIONS

Hydraulische Steuerungen, MIT 239 Bildern (6 pages).

\* cited by examiner

*Primary Examiner*—Robert J. Oberleitner
*Assistant Examiner*—Bradley King
(74) *Attorney, Agent, or Firm*—Bierman, Muserlian and Lucas

(57) ABSTRACT

A brake device for a linear guide comprising a carrier body (1) which is movable on a guide rail (2) and incorporates brake shoes (10) which act on the guide rail (2), and a brake piston (8) which is arranged for displacement by a pressure medium in a brake cylinder (9) of the carrier body (1), the brake device further comprising an energy reservoir in form of a compression spring (11) which acts on the pressure medium that is limited by the brake piston (8), a piston/cylinder assembly is arranged between the compression spring (11) and the brake piston (8), which assembly comprises a unitary control element comprising a displaceable, larger diameter control piston (5) arranged in a control pressure chamber (4) to act on the compression spring (11) and a displaceable, smaller diameter high pressure piston (6) arranged in a high pressure chamber (3) to act on the brake piston (8), a pressure connection (13) for supply of pressure medium into the control pressure chamber (4) being disposed on the carrier body (1).

6 Claims, 1 Drawing Sheet

BRAKING DEVICE FOR A LINEAR DRIVE

FIELD OF THE INVENTION

The invention concerns a brake device for a linear guide comprising a carrier body which is movable on a guide rail and incorporates brake shoes which act on the guide rail, and a brake piston which is arranged for displacement by a pressure medium in a brake cylinder of the carrier body, the brake device further comprising an energy reservoir in form of a compression spring which acts on the pressure medium that is limited by the brake piston.

BACKGROUND OF THE INVENTION

Linear guides are used, among other things, in machine tools with high speed drives, linear platens and laser machining tools. In a brake device for a linear guide known from DE-GM 295 05 080, the braking or locking force is provided by the pressure medium, for example, a hydraulic pressure medium such as oil. However, from the standpoint of safety, this linear guide is inadequate because if there is an unintentional drop of pressure in the pressure medium, the carrier body can no longer be braked or locked on the guide rail.

SUMMARY OF THE INVENTION

The object of the invention is to create a linear guide whose carrier body can be braked and locked mechanically in a reliable manner on the guide rail in emergencies such as pressure medium failure.

The invention achieves this object by the fact that a piston/cylinder assembly is arranged between the compression spring and the brake piston, said assembly comprising a unitary control element comprising a displaceable, larger diameter control piston arranged in a control pressure chamber to act on the compression spring and a displaceable, smaller diameter high pressure piston arranged in a high pressure chamber to act on the brake piston, a pressure connection for supply of pressure medium into the control pressure chamber being disposed on the carrier body. This results in the formation of a hydro-mechanical emergency braking system whose braking energy is provided by the energy reservoir situated in the brake device.

The compression spring which acts as the energy reservoir may be a coil compression spring, a disc spring or spring washers. However, a gas pressure reservoir may also be used for this purpose.

The control piston, the high pressure piston and the compression spring can have a common longitudinal axis extending in the guide direction of the carrier body. By this, a large potential stroke of the high pressure piston which is desirable for safety reasons is obtained.

A compensating reservoir for the pressure medium may be arranged in or on the carrier body and connected by a pressure medium duct to the high pressure chamber and the brake cylinder. Such a compensating reservoir makes it possible to compensate for wear of the brake shoes and leakage losses by a refilling of the pressure medium. It is advantageous in this case to arrange a one-way valve between the compensating reservoir and the pressure medium duct.

Advantageously, the compensating reservoir may have a cylindric configuration and comprise a displaceable compensating piston for the variable pressure medium volume of the reservoir.

BRIEF DESCRIPTION OF THE DRAWINGS

One example of embodiment of the invention is represented in the drawings and will be described more closely below with reference to the appended drawings.

DETAILED DESCRIPTION OF THE DRAWINGS

Figure 1:
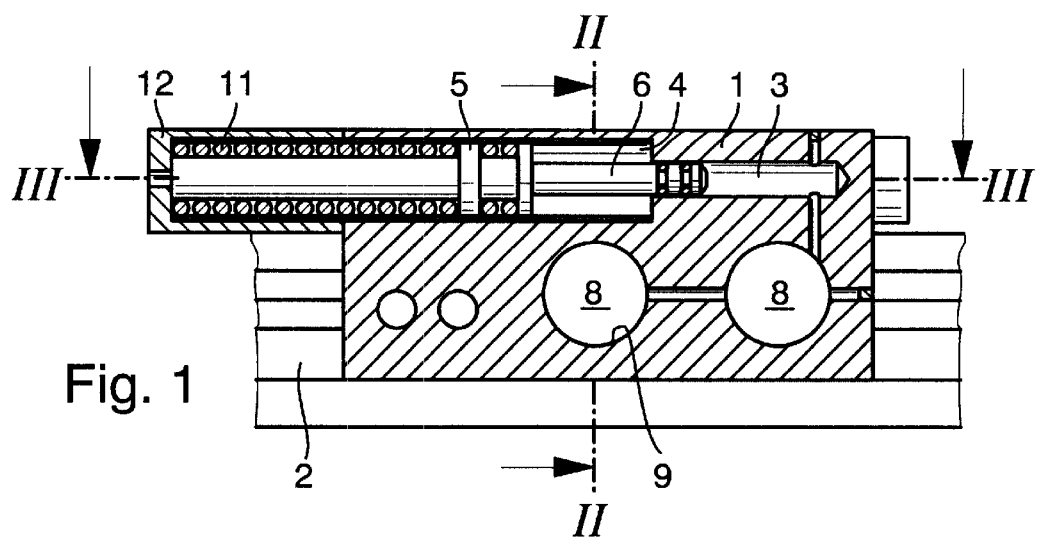
FIG. 1 is a side view of a guide rail and a carrier body displaceable thereon, shown in a longitudinal section along line I—I of FIG. 3, hatching being omitted in this and in the following figures.
Figure 2:
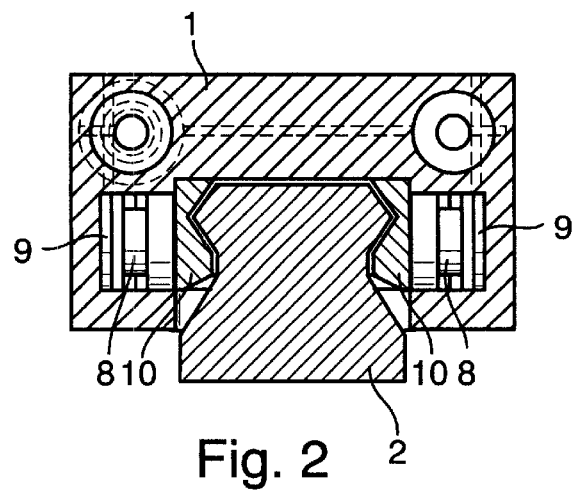
FIG. 2 is a cross-section through the carrier body supported on the guide rail, along line II—II of FIG. 1.
Figure 3:
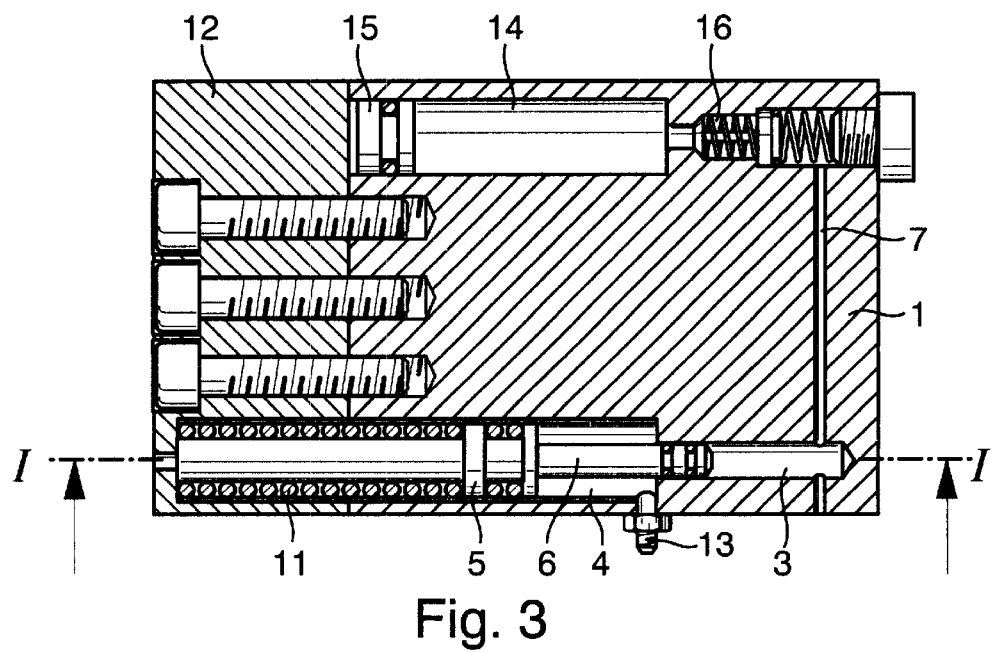
FIG. 3 is a longitudinal section through the carrier body along line III—III of FIG. 1.

The brake device of the invention is conceived as an additional component for guide carriages of linear rolling bearing guides. A high pressure chamber 3 in the form of a bore and a control pressure chamber 4 in the form of a bore coaxial to and with a larger diameter than the high pressure chamber 3 are arranged in the longitudinal direction of a guide rail 2 in a carrier body 2 of a linear guide, the carrier body 1 being arranged for sliding on the guide rail 2. A control element comprising a control piston 5 disposed in the control pressure chamber 4 and a high pressure piston 6 disposed in the high pressure chamber 3 is situated in these two bores. The control piston 5 and the high pressure piston 6 are made as a unitary component. The high pressure piston 6 which has the smaller diameter is arranged with a part of its length for axial displacement in the high pressure chamber 3, while the control piston 5 having the larger diameter is arranged, likewise for axial displacement, in the control pressure chamber 4.

The high pressure chamber 3 is connected by pressure medium ducts 7 in the form of narrow, connecting bores to two brake cylinders 9 arranged in the carrier body 1 and comprising brake pistons 8. One brake piston 8 is arranged in each brake cylinder 9 for displacement towards the guide rail 2 in a direction perpendicular to the longitudinal axis of the guide rail 2. Brake shoes 10 are disposed between the brake pistons 8 and the guide rail 2. All the pressure chambers, i.e. the control pressure chamber 4, the high pressure chamber 3, the pressure medium ducts 7 and the brake cylinders 9, are filled with a pressure medium, for example, a hydraulic oil.

The braking energy is not provided from an external source but is made available within the device. This is achieved with an energy reservoir in the form of a compression spring 11 made as a coil spring through which the control piston 5 is supported on an attachment housing 12 that is screwed onto the carrier body 1.

The control pressure chamber 4 is pressurized by a pressure medium having a pressure of approximately 50 bars supplied through a pressure medium connection 13. As a result of this, the control piston 5 is pressed against the prestressed compression spring 11 and the high pressure piston 6 is relieved completely of pressure. Thus, the high pressure chamber 3 and the pressure medium ducts 7 connected thereto which lead to the brake cylinders 9 containing the brake pistons 8, are free of pressure. In this state, the carrier body 1 is freely movable on the guide rail 2.

If, on occurrence of an emergency, the control pressure is abruptly reduced to the ambient pressure of 1 bar, the entire pre-stress force of the compression spring 11 is transmitted through the control piston 5 to the high pressure piston 6. This piston is displaced by the pre-stress force of the compression spring 11 further into the high pressure chamber 3 where, due to its smaller piston area, the high pressure piston 6 produces a pressure of several hundred bars in the pressure medium. This pressure acts through the pressure medium ducts 7 on the brake pistons 8 arranged in the brake cylinders 9, so that the brake pistons 8 press the brake shoes 10 against the guide rail 2.

To enhance the operating safety and compensate for the wear of the brake shoes, the device comprises a pressure medium or oil reservoir in the form of an integrated compensating reservoir 14 which is sealed from the environment by a readily displaceable compensating piston 15. The compensating reservoir 14 is connected through a one-way valve 16 to the high pressure chamber 3. If in the course of time, due to wear of the brake shoes or slight leakage losses at the piston seal of the high pressure piston 6, the high pressure piston 6 were to migrate further into the bore forming the high pressure chamber 3, the force of the compression spring 11 and, as a result, the braking force would decrease if no compensating reservoir were provided. However, if the control pressure chamber 4 of the brake device provided with the compensating reservoir 14 is pressurized by a pressure medium, for example when the associated machine is switched on, the control piston 5 compresses the compression spring 11. This causes the high pressure piston 6 to be displaced out of the high pressure chamber 3 so that pressure is removed from the brake pistons 8. When a defined partial vacuum is formed in the high pressure chamber 3, the one-way valve 16 opens and replenishes the pressure medium as required.

The advantage of having the compensating reservoir 14 is that braking can be performed with the full braking force even when there is wear of the brake shoes 10. The brake device of the invention which also acts as an emergency brake thus functions maintenance-free and an expensive replacement of the brake shoes is no longer required.

REFERENCE NUMBERS

1 Carrier body
2 Guide rail
3 High pressure chamber
4 Control pressure chamber
5 Control piston
6 High pressure piston
7 Pressure medium duct
8 Brake piston
9 Brake cylinder
10 Brake shoe
11 Compression spring
12 Attachment housing
13 Pressure medium connection
14 Compensating reservoir
15 Compensating piston
16 One-way valve

What is claimed is:

1. A brake device for a linear guide comprising a carrier body which is movable on a guide rail and incorporates brake shoes which act on the guide rail, and a brake piston which is arranged for displacement by a pressure medium in a brake cylinder of the carrier body, the brake device further comprising an energy reservoir in form of a compression spring which acts on the pressure medium that is limited by the brake piston, characterized in that a piston/cylinder assembly is arranged between the compression spring and the brake piston, which assembly comprises a unitary control element comprising a displaceable, larger diameter control piston arranged in a control pressure chamber to act on the compression spring and a displaceable, smaller diameter high pressure piston arranged in a high pressure chamber to act on the brake piston, a pressure connection for supply of pressure medium into the control pressure chamber being disposed on the carrier body, a compensating reservoir for the pressure medium is arranged in or on the carrier body and connected by a pressure medium duct to the high pressure chamber and the brake cylinder and a one-way valve is arranged in the carrier body between the compensating reservoir and the pressure medium duct.

2. A device according to claim 1, wherein two brake cylinders are arranged in the carrier body, and each brake cylinder comprises a brake piston to act on the brake shoes and the guide rail.

3. A device according to claim 1, the compression spring acting as an energy reservoir is formed by a coil compression spring, a disc spring or spring washers.

4. A device according to claim 1, characterized in that the compression spring acting as an energy reservoir is formed by a gas pressure reservoir.

5. A device according to claim 1, wherein the control piston, the high pressure piston and the compression spring have a common longitudinal axis extending in guide direction of the carrier body.

6. A device according to claim 1, characterized in that the compensating reservoir has a cylindric configuration and comprises a displaceable compensating piston for a variable pressure medium volume of the compensating reservoir.

* * * * *